United States Patent
Watenpaugh et al.

(10) Patent No.: US 7,775,542 B1
(45) Date of Patent: Aug. 17, 2010

(54) LIFTING AID FOR FIFTH WHEEL TRAILER LANDING LEG AND METHOD OF USE THEREOF

(76) Inventors: David H. Watenpaugh, P.O. Box 123, Taylorsville, CA (US) 95983; Carla J. Watenpaugh, P.O. Box 123, Taylorsville, CA (US) 95983

(*) Notice: Subject to any disclaimer, the term of this patent is extended or adjusted under 35 U.S.C. 154(b) by 256 days.

(21) Appl. No.: 12/156,502

(22) Filed: Jun. 2, 2008

(51) Int. Cl.
  *B60D 1/66* (2006.01)
(52) U.S. Cl. ................................ 280/475
(58) Field of Classification Search ........... 280/475; 29/244
  See application file for complete search history.

(56) References Cited

U.S. PATENT DOCUMENTS

| | | | |
|---|---|---|---|
| 3,768,088 A | 10/1973 | Risius | |
| 3,944,259 A | 3/1976 | Miller | |
| 4,266,796 A | 5/1981 | Riggs et al. | |
| 4,549,747 A | 10/1985 | Testerman | |
| 4,588,204 A | 5/1986 | Reed | |
| 5,338,047 A | 8/1994 | Knisley | |
| 5,419,535 A * | 5/1995 | Roberts et al. | 254/15 |
| 5,527,054 A | 6/1996 | Williams | |
| 5,887,497 A * | 3/1999 | Ensz | 81/484 |
| D476,461 S | 6/2003 | Dries | |
| 6,726,235 B2 | 4/2004 | McCarty | |
| 6,764,065 B2 * | 7/2004 | Fox | 254/420 |
| 7,097,158 B2 | 8/2006 | BarBaruolo | |
| 7,197,965 B1 * | 4/2007 | Anderson | 81/73 |
| 7,219,915 B2 | 5/2007 | Christensen | |
| 2007/0212186 A1 * | 9/2007 | Parks | 410/156 |

* cited by examiner

*Primary Examiner*—Lesley Morris
*Assistant Examiner*—Marc A Scharich
(74) *Attorney, Agent, or Firm*—Montgomery Patent and Design; Robert C. Montgomery; Joseph T. Yaksich

(57) ABSTRACT

An apparatus designed to aid in the lifting of support legs on fifth wheel travel trailers is herein disclosed. The device may be applied thereto one (1) or both front support legs of a fifth wheel trailer to aid in the lifting of support landing legs during the stowaway process, comprised of a "U"-shaped bracket and a retaining pin and fastener which fit around and through the bottom of the landing leg as provided as part of a trailer. A support arm is welded onto the face of the "U"-shaped bracket which is provided with a protective rubber tip. To use the invention, the trailer is attached to a tow vehicle as part of the customary towing process. During the landing leg stowaway process, the user simply removes the landing leg pin as provided with the trailer. Next, the leg is lifted using the invention until the leg is stowed in the upright position. This procedure ensures that the user's hands or fingers will not be pinched or crushed during the process.

8 Claims, 2 Drawing Sheets

US 7,775,542 B1

LIFTING AID FOR FIFTH WHEEL TRAILER LANDING LEG AND METHOD OF USE THEREOF

RELATED APPLICATIONS

The present invention was first described in an Official Record of Invention on Jul. 20, 2007 that is on file at the offices of Montgomery Patent and Design, LLC, the entire disclosures of which are incorporated herein by reference.

FIELD OF THE INVENTION

The present invention relates generally to a hand-held device for manipulation of landing legs of a common recreational vehicle trailer during deployment or stowage, particularly a fifth wheel trailer.

BACKGROUND OF THE INVENTION

A common recreational vehicle is that of the fifth wheel travel trailer towed by a pickup or medium duty truck. When these rigs are parked and disconnected from the tow vehicle, support for their front of the rig is provided by two (2) support landing legs, which are lowered into place during the setup process. When leaving, these landing legs are then lifted back up and stowed during towing. During this lifting process, it is common for one's fingers to be pinched or even crushed while the landing legs are being lifted. This is due to the fact that there is no easy way to grip and lift the landing legs at the same time. Accordingly, there exists a need for a means by which landing legs on fifth wheel travel trailers can be easily lifted without the risk of injury. The development of the invention herein described fulfills this need.

U.S. Pat. No. 7,219,915 filed by Christensen discloses a trailer ball raising and lowering apparatus. This patent does not appear to disclose a lifting aid for a fifth wheel trailer landing leg.

U.S. Pat. No. D 476,461 filed by Dries discloses an offset swivel jack. This design patent does not appear to disclose a device similar in design to the instant invention nor does it appear to disclose a lifting aid for a fifth wheel trailer landing leg.

U.S. Pat. No. 7,097,158 filed by BarBaruolo discloses a lift mechanism for fifth wheel trailer tube and foot pad. This patent does not appear to disclose a lifting device for fifth wheel trailer landing legs that is operated by hand without the need for cables.

U.S. Pat. No. 6,726,235 filed by McCarty discloses a trailer mover. This patent does not appear to disclose a device that manual assists in the raising or lowering of a fifth wheel trailer landing leg.

U.S. Pat. No. 5,527,054 filed by Williams discloses a leg adjustment for fifth-wheel trailer lifting/leveling legs. This patent does not appear to disclose a lifting aid for a fifth wheel trailer landing leg.

U.S. Pat. No. 5,338,047 filed by Knisley discloses a trailer alignment device. This patent does not appear to disclose a device that manual assists in the raising or lowering of a fifth wheel trailer landing leg.

U.S. Pat. No. 4,588,204 filed by Reed discloses a trailer hitch caddy. This patent does not appear to disclose a lifting aid for a fifth wheel trailer landing leg.

U.S. Pat. No. 4,549,747 filed by Testerman discloses a fifth wheel lifter/protector. This patent does not appear to disclose a device for assisting in the manipulation of a fifth wheel trailer landing leg.

U.S. Pat. No. 4,266,796 filed by Riggs and Riggs discloses a trailer tongue wheel. This patent does not appear to disclose a lifting aid for a fifth wheel trailer landing leg.

U.S. Pat. No. 3,944,259 filed by Miller discloses a trailer jacking device. This patent does not appear to disclose a device that manual assists in the raising or lowering of a fifth wheel trailer landing leg.

U.S. Pat. No. 3,768,088 filed by Risius discloses a trailer stand leg position indicator. This patent does not appear to disclose a lifting aid for fifth wheel trailer legs.

The prior art discloses inventions for assisting in the movement of manipulation of the hitch or semi-automated deployment of the landing legs. The prior art does not appear to disclose a hand-held device for manipulation of the landing legs during deployment or stowage.

SUMMARY OF THE INVENTION

In view of the foregoing disadvantages inherent in the prior art, it has been observed that there is need for a lifting aid for fifth wheel trailer landing leg.

It is an object of the lifting aid for fifth wheel trailer landing leg to provide a device and method to aid, in the lifting of a support landing leg on fifth wheel travel trailers. The lifting aid for fifth wheel trailer landing legs is envisioned to be applied thereto at least one (1) front landing leg of a fifth wheel trailer to aid in lifting of said landing legs for storage.

It is a further object of the lifting aid for fifth wheel trailer landing legs to provide for the possibility of a permanent mounting to the landing legs if the user so desires.

It is another object of the lifting aid for fifth wheel trailer landing legs to provide for usage during the deployment of the landing legs as well as the storage of the landing legs.

It is yet another object of the method described herein to provide for the safety of the user by insuring that a user's hands or fingers 80 will not be pinched or crushed during the process.

Still another object of the lifting aid for fifth wheel trailer landing legs provides that the device may be provided as an accessory thereto a fifth wheel trailer during an original purchase or may be purchased separately and applied thereto an existing trailer as previously described.

An aspect of the lifting aid for fifth wheel trailer landing leg comprises a bracket, a retaining pin, and an arm. The device comprises a strong welded assembly. The bracket comprises a formed three-sided channel-shaped fixture using preferably steel flat stock approximately one (1) to two (2) inches wide which wraps snuggly around a vertical portion of an existing conventional fifth wheel landing leg along a horizontal plane. The bracket may be sized accordingly so as to fit snuggly therearound various landing leg sizes of various dimensions. The bracket further comprises a pair of opposing bracket orifices located therealong outer vertical sides of said bracket providing an attachment means of the device thereto landing leg hole portions of the landing legs via insertion therethrough of a retaining pin. In use, the bracket forms an intimate vertical and non-rotating connection thereto an existing landing leg portion. Said bracket orifices comprise a corresponding diameter and position thereto existing equally-spaced landing leg holes located along vertical surfaces of the landing legs being approximately three-eighths (⅜) inches in diameter. The retaining pin comprises an "L"-shaped round steel member approximately three-eighths (⅜) inch in diameter comprising a short length at a proximal end forming a mechanical stopping means thereto the retaining pin during insertion. The retaining pin further comprises a long side suitable in length so as to pass completely through the bracket and extend approximately one-half (½) inch beyond said bracket forming a distal end thereof. The fastener orifice is located at said distal end of the retaining pin providing a locking attachment of the retaining pin thereto the bracket via an inserted fastener.

Another aspect of the lifting aid for fifth wheel trailer landing legs comprises a bracket attached to an arm comprising a rugged "L"-shaped steel rod approximately one-half (½) inch in diameter. The short portion is attached thereto a vertical outside surface of a center portion of the "U"-shaped bracket. The long portion of the "L"-shaped arm extends horizontally outward therefrom the bracket portion forming a convenient handle being suitable for manually grasping by a user so as to manipulate said device and included landing leg in a vertical direction during storage of said landing leg.

Yet another aspect of the lifting aid for fifth wheel trailer landing legs comprises a fastener and a rubber tip. The retaining pin further comprises a fastener orifice being drilled perpendicularly therethrough said retaining pin being approximately one-eighth (⅛) inch diameter and located along a distal end of the retaining pin. The fastener orifice provides a locking attachment of the retaining pin to the bracket via an appropriately-sized and inserted fastener. The arm further comprises a rubber tip which provides an improved gripping means and a safety means therefrom sharp edges present along said distal end of the arm. The rubber tip is envisioned being made using rubber or other synthetic compounds providing a high friction surface thereto a user. The rubber tip is further envisioned to be affixed to the arm, thereby decreasing a force required to securely grasp and lift the device during use.

A method for installing and utilizing the lifting aid for fifth wheel trailer landing leg during the landing leg stowing task may be achieved by performing the following steps: having a trailer attached to a tow vehicle in an expected manner as part of a customary towing process; attaching the device thereto a lower landing leg hole portion of the landing leg; grasping the arm portion of the device using the rubber tip; positioning the bracket portion of the device around the landing leg so as to align the bracket orifices therewith the landing leg holes; inserting the retaining pin therethrough the bracket orifices and aligned landing leg holes until reaching a mechanical limit; inserting the fastener therethrough said fastener orifice portion of the retaining pin to securely lock the device into position; lifting the landing leg base therefrom a ground surface using existing manual or motorized winching devices provided as a part of a trailer, if necessary; removing an existing landing leg locking pin as provided with the trailer; lifting the device and attached landing leg until the landing leg is in a stowed position; re-inserting the existing leg locking pin therein the landing leg holes, thereby retaining said landing leg in an upward and stored position; removing the device therefrom the landing leg by removing the fastener and retaining pin, if desired; repeating the above steps to store the remaining landing leg portion in like manner; storing the device until needed again; and, benefiting from improved safety and cleanliness to a user during a landing leg storage task.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

| | |
|---|---|
| 10 | lifting aid for fifth wheel trailer landing leg |
| 20 | bracket |
| 25 | weld |
| 27 | bracket orifice |
| 30 | arm |
| 35 | rubber tip |
| 40 | retaining pin |
| 42 | fastener orifice |
| 45 | fastener |
| 80 | user |
| 90 | landing leg |
| 91 | leg locking pin |
| 92 | landing leg base |
| 93 | landing leg hole |

DETAILED DESCRIPTION OF THE PREFERRED EMBODIMENT

Figure 1:
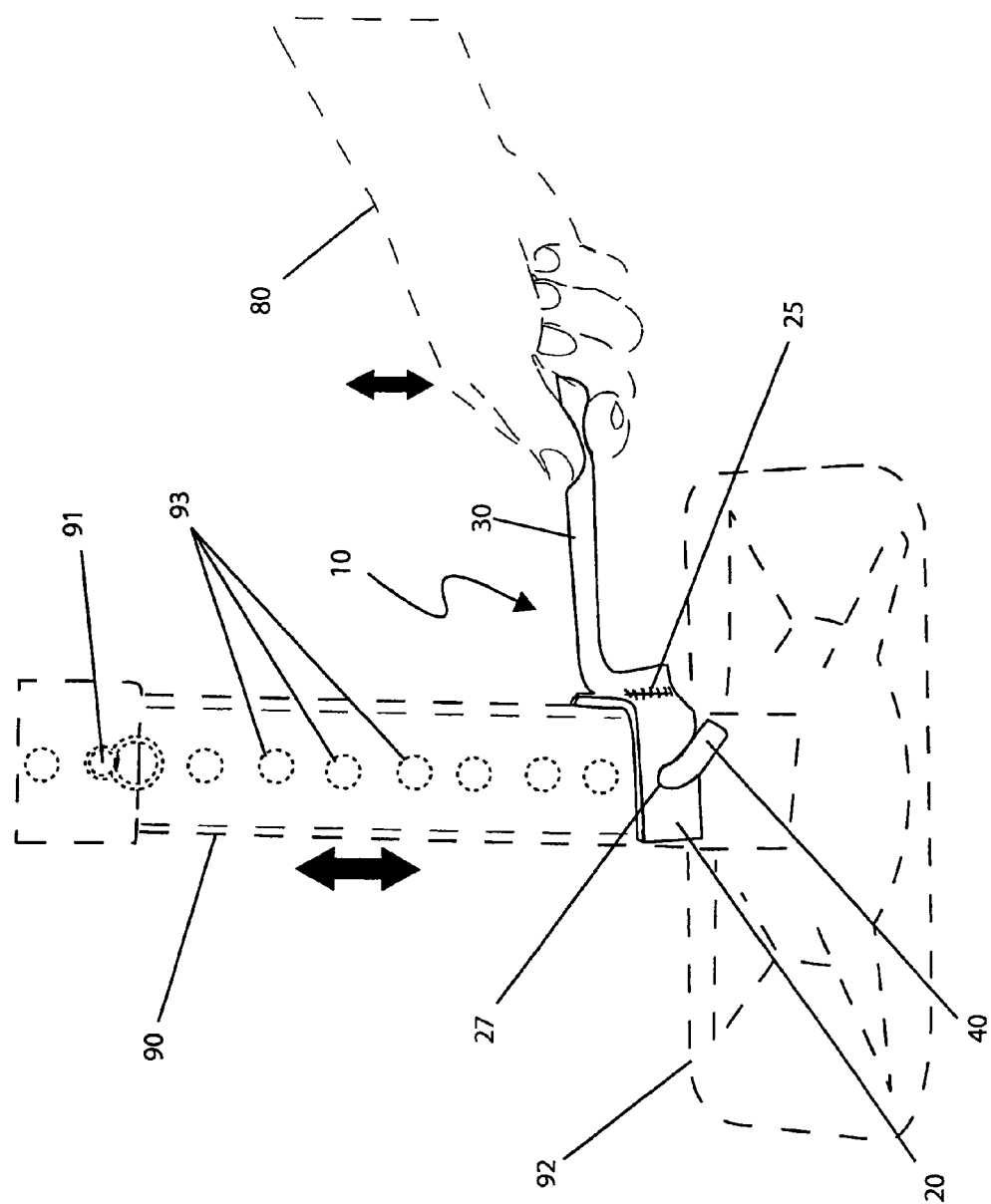
FIG. 1 is a side perspective view of a lifting aid for fifth wheel trailer landing leg 10 depicting an in-use state, according to a preferred embodiment of the present invention; and, FIG. 2 is a top perspective view of a lifting aid for fifth wheel trailer landing leg 10, according to a preferred embodiment of the present invention.
Figure 2:
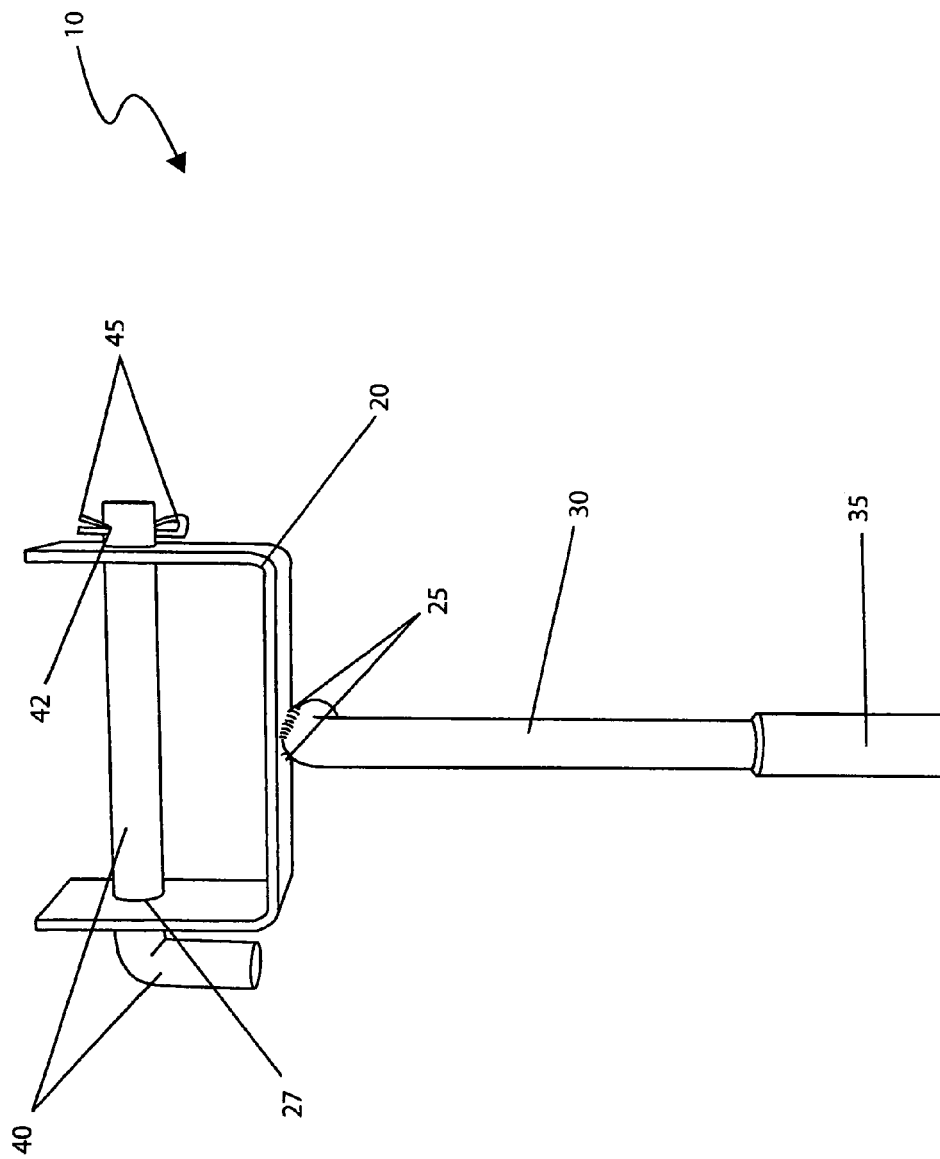

The best mode for carrying out the invention is presented in terms of its preferred embodiment, herein depicted within FIGS. 1 and 2. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes a device and method for a lifting aid for fifth wheel trailer landing leg (herein described as the "device") 10, particularly in the lifting of a support landing leg 90 on fifth wheel travel trailers. The device 10 is envisioned to be applied thereto at least one (1) front landing leg 90 of a fifth wheel trailer to aid in lifting of said landing legs 90 during a storage task. The device 10 comprises a "U"-shaped bracket 20 and a retaining pin 40 and fastener 45 which fit around and through the bottom of the landing leg 90. The device 10 may be provided as part of a fifth wheel trailer or purchased separately. An arm 30 approximately six (6) to twelve (12) inches long is welded 25 onto the face of the "U"-shaped bracket 20 which is provided with a protective rubber tip 35.

Referring now to FIG. 1, a side perspective view of the device 10 depicting an in-use state, according to the preferred embodiment of the present invention, is disclosed. The device 10 comprises a bracket 20, a retaining pin 40, and an arm 30. The device 10 comprises a strong welded assembly envisioned being made using common fabrication processes and rugged metal materials such as, but not limited to: painted steel, plated steel, stainless steel, aluminum, or the like. The bracket 20 comprises a formed three-sided channel-shaped fixture using preferably steel flat stock approximately one (1) to two (2) inches wide which wraps snuggly around a vertical portion of an existing conventional fifth wheel landing leg 90 along a horizontal plane. The bracket 20 is illustrated here being applied to a standard two (2) inch square landing leg member 90; however, it is understood that the device 10 may be sized accordingly so as to fit snuggly therearound various landing leg sizes 90 having lesser or greater outside dimensions and as such should not be considered a limiting factor of the invention 10. The bracket 20 further comprises a pair of opposing bracket orifices 27 located therealong outer vertical sides of said bracket 20 providing an attachment means of the device 10 thereto landing leg hole portions 93 of the landing legs 90 via insertion therethrough of a retaining pin 40. In use, the bracket 20 forms an intimate vertical and non-rotating connection thereto an existing landing leg portion 90. Said bracket orifices 27 comprise a corresponding diameter and position thereto existing equally-spaced landing leg holes 93 located along vertical surfaces of the landing legs 90 being approximately three-eighths (3/8) inches in diameter. The retaining pin 40 comprises an "L"-shaped round steel member approximately three-eighths (3/8) inch in diameter comprising a short length at a proximal end forming a mechanical stopping means thereto the retaining pin 40 during insertion. The retaining pin 40 further comprises a long side suitable in length so as to pass completely through the bracket 20 and extend approximately one-half (1/2) inch beyond said bracket 20 forming a distal end thereof. The fastener orifice 42 is located at said distal end of the retaining pin 40 providing a locking attachment of the retaining pin 40 thereto the bracket 20 via an inserted fastener 45 (see FIG. 2).

The bracket 20 further provides a welded attachment thereto an arm 30 comprising a rugged "L"-shaped steel rod approximately one-half (1/2) inch in diameter produced using a metal bending process and comprising short and long portions in an expected manner. The short portion is attached thereto a vertical outside surface of a center portion of the "U"-shaped bracket 20 via a common parallel weld bead 25. The long portion of the "L"-shaped arm 30 extends horizontally outward therefrom the bracket portion 20 forming a convenient handle being suitable for manually grasping by a user 80 so as to manipulate said device 10 and included landing leg 90 in a vertical direction during storage of said landing leg 90.

Referring now to FIG. 2, a top perspective view of the device 10, according to the preferred embodiment of the present invention, is disclosed. The device 10 comprises a fastener 45 and a rubber tip 35. The retaining pin 40 further comprises a fastener orifice 42 being drilled perpendicularly therethrough said retaining pin 40 being approximately one-eighth (1/8) inch diameter and located along a distal end of the retaining pin 40. The fastener orifice 42 provides a locking attachment of the retaining pin 40 thereto the bracket 20 via an appropriately-sized and inserted fastener 45 preferably using common fastening means such as cotter pins, lynch pins, circle cotters, tab lock pins, or the like. The arm 30 further comprises a rubber tip 35 which provides an improved gripping means and a safety means therefrom sharp edges present along said distal end of the arm 30. The rubber tip 35 is envisioned being made using rubber or other synthetic compounds providing a high friction surface thereto a user 80. The rubber tip 35 is further envisioned to be affixed thereto the arm 30 using adhesives, friction fit, or the like, thereby decreasing a force required to securely grasp and lift the device 10 during use.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the device 10, it would be installed as indicated in FIG. 1.

The method of utilizing the device 10 during the landing leg 90 stowing task may be achieved by performing the following steps: having a trailer attached to a tow vehicle in an expected manner as part of a customary towing process; attaching the device 10 thereto a lower landing leg hole portion 93 of the landing leg 90; grasping the arm portion 30 of the device 10 using the rubber tip 35; positioning the bracket portion 20 of the device 10 around the landing leg 90 so as to align the bracket orifices 27 therewith the landing leg holes 93; inserting the retaining pin 40 therethrough the bracket orifices 27 and aligned landing leg holes 93 until reaching a mechanical limit; inserting the fastener 45 therethrough said fastener orifice portion 42 of the retaining pin 40 to securely lock the device 10 into position; lifting the landing leg base 92 therefrom a ground surface using existing manual or motorized winching devices provided as a part of a trailer, thereby removing a load thereupon the landing legs 90, if necessary; removing an existing landing leg locking pin 91 as provided with the trailer; lifting the device 10 and attached landing leg 90 until the landing leg 90 is in a stowed position; re-inserting the existing leg locking pin 91 therein the landing leg holes 93, thereby retaining said landing leg 90 in an upward and stored position; removing the device 10 therefrom the landing leg 90 by removing the fastener 45 and retaining pin 40, if desired; repeating the above steps to store the remaining landing leg portion 90 in like manner; storing the device 10 until needed again; and, benefiting from improved safety and cleanliness to a user 80 during a landing leg 90 storage task. This procedure ensures that a user's hands or fingers 80 will not be pinched or crushed during the process.

It is further understood that the device 10 may also be utilized to support the lifting leg portion 90 of a trailer during a deployment task of the landing leg 90 in like manner, thereby providing additional safety and convenience to a user 80.

Additionally, the device may be permanently affixed thereto each landing leg portion 90 based upon a user's 80 preference.

The device 10 may be provided as an accessory thereto a fifth wheel trailer during an original purchase or may be purchased separately and applied thereto an existing trailer as previously described.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A device for lifting an existing fifth wheel trailer landing leg, said device comprising:
a retaining pin having a fastener orifice extending perpendicularly through said retaining pin and being located at a distal end of said retaining pin;
a three-sided bracket defining a channel configured to fit around a vertical portion of the existing fifth wheel trailer landing leg, said bracket further having a plurality of opposing bracket orifices positioned along outer vertical sides thereof;
said retaining pin being removably interfitted through a bottom of the existing fifth wheel trailer landing leg and said bracket orifices respectively;
a fastener removably interlocked through said fastener orifice; and,
an arm welded onto a face of said bracket, said arm including a rod attached to an outside surface of a center portion of said bracket.

2. The device of claim 1, wherein said fastener comprises one of a cotter pin, a lynch pin, a circle cotter and a tab lock pin.

3. The device of claim 1, wherein said retaining pin comprises: an elongate portion of suitable length to pass completely through said bracket, said elongate portion extending approximately one-half (½) inch beyond said bracket.

4. The device of claim 1, wherein said bracket comprises first, second and third flat portions, wherein each of said flat portions measures approximately one (1) inch to approximately two (2) inches in width.

5. The device of claim 1, wherein said plurality of opposing bracket orifices of said bracket are located along a plurality of mutually exclusive surfaces.

6. The device of claim 1, wherein said rod of said arm measures approximately one-half (½) inch in diameter.

7. The device of claim 1, wherein a distal end of said rod is provided with a rubber layer disposed thereabout.

8. A method for lifting an existing fifth wheel trailer landing leg, said method comprising the steps of:
providing a retaining pin having a fastener orifice extending perpendicularly through said retaining pin and being located at a distal end of said retaining pin;
providing a three-sided bracket defining a channel;
providing an arm welded onto a face of said bracket, said arm including a rod attached to an outside surface of a center portion of said bracket;
forming a plurality of bracket orifices along outer vertical sides of said bracket;
positioning said bracket around a vertical portion of the existing fifth wheel trailer landing leg;
removably interfitting said retaining pin through a bottom of the existing fifth wheel trailer landing leg and said bracket orifices respectively;
providing and removably interlocking a fastener through said fastener orifice;
attaching an existing fifth wheel trailer to a tow vehicle;
removing an existing fifth wheel trailer landing leg pin from the existing fifth wheel trailer; and,
lifting the existing fifth wheel trailer landing leg by pulling upwardly along said arm.

* * * * *